United States Patent [19]

Condon

[11] 3,729,695

[45] Apr. 24, 1973

[54] COMMUTATING CAPACITOR IMPEDANCE DEVICE

[75] Inventor: Joseph Henry Condon, Summit, N.J.

[73] Assignee: Bell Telephone Laboratories, Incorporated, Murray Hill, Berkeley Heights, N.J.

[22] Filed: May 18, 1972

[21] Appl. No.: 254,384

[52] U.S. Cl. .................333/70 A, 333/20, 333/24 C, 328/167

[51] Int. Cl. ............................H03h 7/10, H03h 7/14

[58] Field of Search ....................333/70 A, 70 R, 19, 333/7, 20, 24 C, 76; 328/151, 165, 167; 324/121 R, 85

[56] References Cited

UNITED STATES PATENTS 3,514,726 5/1970 Poschenrieder ....................333/70 R 2,439,255 4/1948 Longfellow..............................333/7

*Primary Examiner*—Rudolph V. Rolinec
*Assistant Examiner*—Marvin Nussbaum
*Attorney*—R. J. Guenther et al.

[57] ABSTRACT

Plural capacitors are interconnected in a recurrent sequence of different combinations of capacitors between input and output terminals in each period of an input signal that is to be filtered. The frequency of recurrence of the capacitor interconnection sequence between the input and output terminals is the frequency that is subjected to the greatest attenuation or response between those input and output terminals. Different arrangements for commutating the capacitor connections through the mentioned sequence are shown. Applications of the resulting commutating capacitor unit for bandpass filtering and band rejection filtering are also presented.

11 Claims, 14 Drawing Figures

COMMUTATING CAPACITOR IMPEDANCE DEVICE

BACKGROUND OF THE INVENTION

This invention relates to commutating capacitor circuits for dynamically simulating particular electric circuit impedance effects.

PRIOR ART

Groups of capacitors have been switched individually into an electric circuit in a recurrent sequence to simulate certain impedance effects, but such arrangements usually operate strictly on a type of sampling and holding principle. Consequently, many capacitors must be used in order to obtain a good representation of the fundamental characteristic sought; but the use of such large numbers of capacitors also tends to generate many harmonic effects in the circuit frequency response. For example, multiple capacitors have been individually switched into shunt connection across a signal path to produce a bandpass filter. Embodiments employing only three capacitors yield a rather crude three-sample representation of the fundamental frequency which is to be passed, and if the number of capacitors is increased there is a marked increase in the number and amplitude of harmonic effects appearing in the output. Similarly, plural capacitors have been individually switched in series in a signal path to produce a band rejection filter. Likewise in this case, numerous harmonically located rejection bands appear in the response and such spurious effects can, of course, interfere with the desired signal passband. Consequently, it is usually necessary to add an additional filter in the signal path to eliminate responses above a predetermined cut-off frequency.

STATEMENT OF THE INVENTION

In an illustrative embodiment of the present invention, a dynamic two-terminal device is provided and includes a plurality of capacitors interconnected in a circuit arrangement having more than two terminals. Differently paired combinations of the capacitor circuit terminals are sequentially connected to the device input and output connections in a predetermined recurring sequence of time intervals. Each combination includes in series therebetween at least two of the capacitors.

The resultant characteristics of the device contain a greater number of signal samples in each analog input signal cycle than were heretofore possible with the same number of capacitors. Likewise the device evidences an impulse response which has an alternating stepwise waveform. Although the device response includes some harmonic effects, many such effects which have been heretofore present in the prior art commutating capacitor arrangements are entirely eliminated and others are greatly suppressed.

BRIEF DESCRIPTION OF THE DRAWINGS

A more complete understanding of the invention and the various features, objects and advantages thereof may be obtained from the following detailed description when taken in connection with the appended claims and the attached drawings in which:

DETAILED DESCRIPTION

Figure 1A:
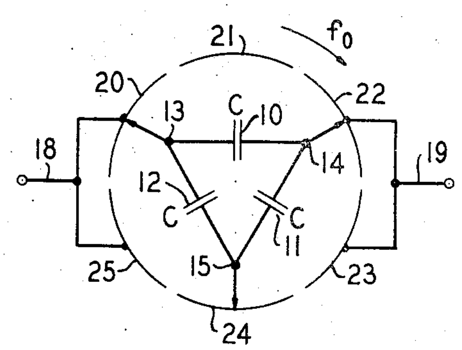
FIGS. 1A and 1B include simplified schematic diagrams of commutating capacitor two-terminal devices in accordance with the present invention.

In FIG. 1A, a plurality of capacitors are interconnected with one another in a circuit which includes a like plurality of terminals to form a two-terminal impedance device. Thus, three capacitors 10, 11, and 12 of equal capacitance C are interconnected in a delta circuit configuration having delta apex terminals 13, 14, and 15. The delta circuit terminals are connectable to an input connection 18 and an output connection 19 by way of six commutating switch segments 20, 21, 22, 23, 24, and 25. Input connection 18 is connected to both of the switch segments 20 and 25 and output connection 19 is similarly connected to switch segments 22 and 23.

The circular arrangement of commutating switch segments 20 through 25 is intended to indicate schematically that the delta connection of capacitors is rotatable (by means not shown) for sequentially contacting different sets of three segments which are alternately disposed in the circular sequence illustrated in the drawing. Thus, terminals 13, 14, and 15 are shown in contact with switch segments 20, 22, and 24, respectively. In the next clockwise, sequential, rotation position they would contact segments 21, 23, and 25. In a third interval of rotation, the odd numbered commutating switch segments are once again contacted by the delta circuit terminals, but now the terminals 13, 14, and 15 are in contact with the segments 22, 24, and 20, respectively.

It will thus be appreciated that as the delta circuit is rotated one of the capacitors thereof is directly connected between the input connection 18 and the output connection 19 and the remaining two capacitors are connected in series across that one capacitor. Thus as the delta circuit is rotated, the function of each capacitor in that circuit changes with respect to the input and output connections 18 and 19 in each of the six possible positions of the delta circuit. That is, the function changes in the senses of which position the capacitor occupies with respect to the input and output connections and in which polarity sense the capacitor occupies that position. As indicated in FIG. 1A, it is assumed that the delta circuit is rotated in a clockwise direction through its sequence of positions; and it is further assumed that such sequence is repeated with a frequency $f_0$. It will subsequently be shown how the frequency $f_0$ is related to the frequencies of a signal applied between the input and output connections 18 and 19.

Figure 1B:
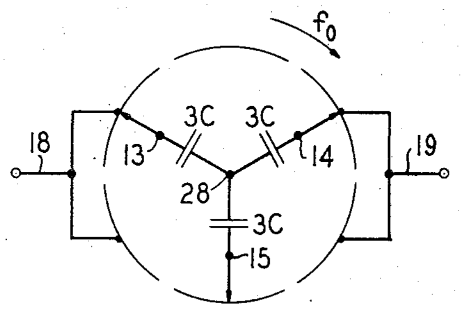

FIG. 1B illustrates a modified form of the two-terminal device presented in FIG. 1A. In the former figure, the capacitors are connected in a star circuit arrangement and although the capacitors are of like capacitance within the circuit of FIG. 1B, each has three times the capacitance of the respective capacitors in the delta circuit arrangement of FIG. 1. The electrical characteristics of the embodiment of FIG. 1B are essentially the same as those of the embodiment of FIG. 1A, and in each commutating position two of the capacitors are connected in series between connections 18 and 19. However, the embodiment of FIG. 1B is substantially easier to manufacture in the tantalum film capacitor technology because the star connection includes a central terminal 28 which is common to all three of the capacitors.

Figure 1C:
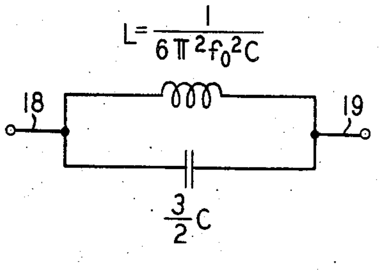
FIG. 1C depicts a conventional inductance capacitor circuit of a type which the commutating capacitor units of FIGS. 1 and 2 resemble in some ways.

It will subsequently be shown that the embodiments of FIGS. 1A and 1B have electrical characteristics which resemble in some ways a two-terminal parallel inductance-capacitance circuit of the type shown in FIG. 1C. In that circuit, the capacitance utilized is one and one-half times the capacitance of each capacitor in the embodiment of FIG. 1A. Likewise, the inductance of the circuit in FIG. 1C is equal to $1/(6\pi^2 f_0^2 C)$.

Figure 1D:
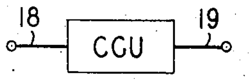
FIG. 1D is a schematic representation utilized herein for two-terminal commutating capacitor devices of the type illustrated in FIGS. 1A and 1B.

FIG. 1D illustrates the schematic representation of a commutating capacitor unit (CCU), sometimes called a commutating capacitor triplet, of the type illustrated in FIG. 1A or FIG. 1B and this representation is utilized in the remainder of the drawings. The representation of FIG. 1D is considered to include appropriate arrangements for commutating the capacitor connections as hereinbefore described. Although these connections can be commutated by either electrical or mechanical arrangements, electronic commutation is preferred because of its compatibility with integrated circuit technology. Thus, there are presented in FIGS. 2 and 3 two different arrangements for electronically commutating capacitor connections in the embodiment of FIG. 1A. In each case, the arrangement is also applicable to the circuit of FIG. 1B.

Figure 2:
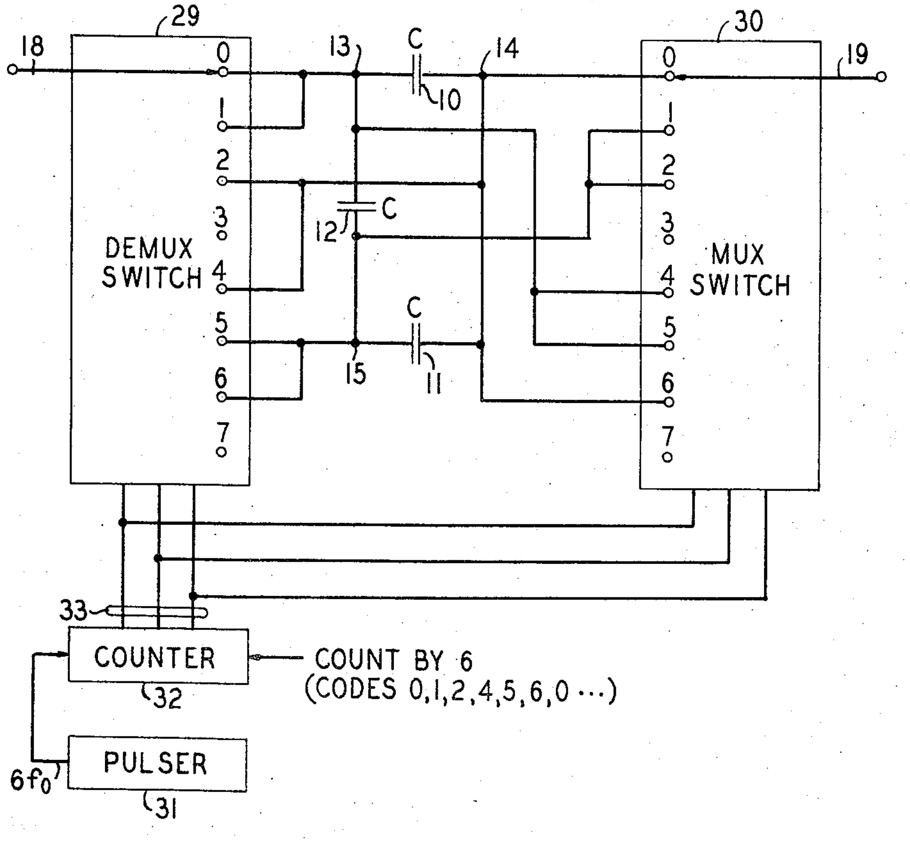
FIGS. 2 and 3 are schematic diagrams of different forms of electronic circuits for commutating capacitor connections in two-terminal devices of the type shown in FIGS. 1A and 1B.

Referring to FIG. 2 the delta circuit terminals 13, 14, and 15 are each connected to different pairs of numbered terminals of multiplexing type switches 29 and 30. The switches 29 and 30 are advantageously of a type which are presently commercially available and which are responsive to binary coded input signals identifying one of the eight numbered switched terminals to which the remaining switch terminal is to be connected. In this case the input connection 18 is that remaining terminal of the demultiplexing switch 29, and the output connection 19 is the remaining terminal of the multiplexing switch 30. In each of the switches, the eight terminals are numbered in corresponding positions 0 through 7, respectively. Delta circuit terminal 13 is connected to terminals 0 and 1 of switch 29 and terminals 4 and 5 of switch 30. Similarly, delta circuit terminal 14 is connected to terminals 2 and 4 of switch 29 and terminals 1 and 6 of switch 30. Delta circuit terminal 15 is connected to terminals 5 and 6 of switch 29 and terminals 1 and 2 of switch 30.

A pulser 31 in FIG. 2 provides a train of output pulses at six times the frequency $f_0$ to a counter 32 which is arranged to count by six and produce on three output circuits 33 binary coded signals representing six of the eight terminals in the multiplexing switches 29 and 30. Thus, for the delta circuit connections just outlined, counter 32 is arranged to produce in recurrent sequence on the circuits 33 binary coded signals for the numbers 0, 1, 2, 4, 5, and 6. These signals cause the input and output connections 18 and 19 to scan the multiplexing switch terminals indicated and skip the switch terminals 3 and 7. The effect of this operation is to cause the input and output connections 18 and 19 to dwell on each coded switch terminal for one-sixth of the period required for a scan of the complete sequence and to be in connection with each delta circuit terminal for one-third of the same period. However, because of the connection arrangement previously outlined between the terminals of switches 29 and 30 and the delta circuit terminals, the input connection 18 and the output connection 19 are coupled to the respective delta circuit terminals in different phases. The resultant effect for the switching of the arrangement in FIG. 2 is the same as that already described for the embodiment of FIG. 1A.

Figure 3:
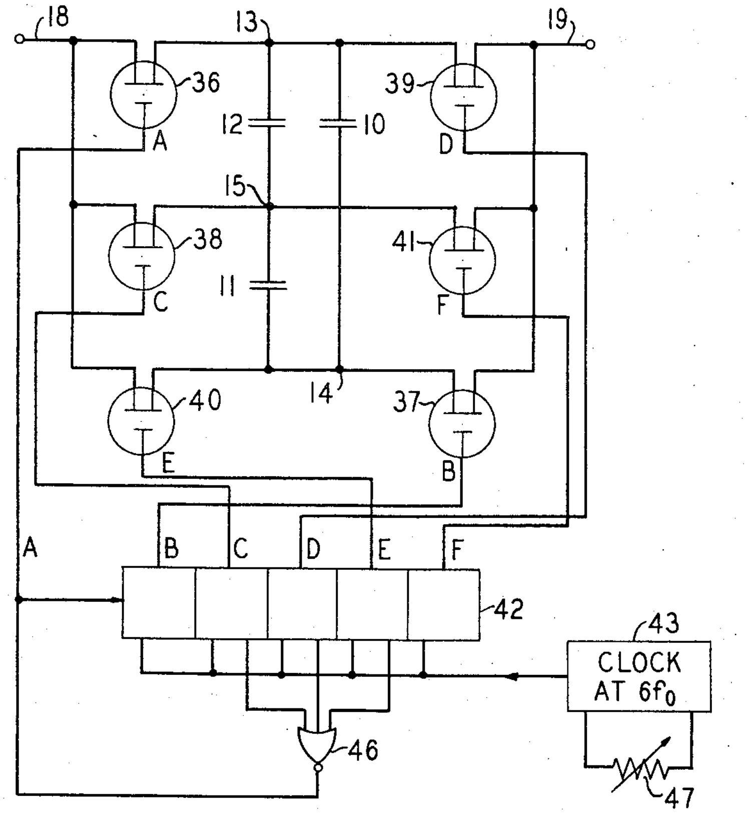

In the embodiment of FIG. 3, a similar effect is produced with substantially less circuit hardware. Six field effect transistors, 36 through 41 are provided with gate electrodes designated A through F, respectively. The six transistors have their source-drain paths connected between the delta circuit terminals and the input and output connections of the commutating capacitor unit. Thus, transistors 36, 38, and 40 can be energized to connect delta circuit terminals 13, 15, and 14, respectively, to input connection 18. Similarly, transistors 39, 41, and 37 can be energized to couple the delta circuit terminals to the output connection 19.

A shift register 42 having R−1 stages is provided, where R is equal to the number of field effect transistors. The register 42 is provided with shift pulses from a clock source 43 operating at a rate $Rf_0$, i.e., $6f_0$ in this case. The R-3 central stages of the register 42 have output connections that are coupled through a NOR gate 46 to an input of the first stage in the shift register operating sequence, assuming that the register operates for shifting from left to right as illustrated in FIG. 3. Six output connections A through F from the register 42 are provided for connection to correspondingly designated gate electrodes of the switching transistors 36 through 41, respectively. The output connection A is provided from the output of NOR gate 46 and the output connections B through F are provided from the respective stages of the register 42. In each case, a high, or binary ONE voltage condition on an output connection enables the corresponding switching transistor for conduction.

As long as any of the three central stages of register 42 is in a set condition, the corresponding output to a switching transistor is high; and the output of NOR gate 46 is low. Consequently the lead A is low, and the transistor 36 is biased off, i.e., in a nonconducting state. When all of the three central stages are in the reset condition, the output of gate 46 is high and transistor 36 is enabled for conduction. The next following shift pulse from clock source 43 allows the first stage of register 42 to be set by the high signal on the A lead and provide a high signal on the B lead as well so that the transistor 37 is also enabled for conduction. Thereafter, in each clock period, a different combination of two adjacent output leads of the register 42 are high and all of the rest of the output leads are in a low voltage condition. This output lead signal pattern is circulated among the leads in a recurring sequence. The result is to connect the outputs of the first register stage and alternate subsequent stages to activate the output field effect transistors 37, 39, and 41 and to connect the outputs of NOR gate 46 and the remaining shift register stages to activate input transistors 36, 38, and 40. This arrangement effects the same switching operation described in connection with FIG. 1A. A variable resistor 47 connected to the clock source 43 is provided to represent schematically an adjustable output frequency for that clock. Consequently, by changing that frequency, the commutating capacitor unit is advantageously caused to scan the frequency spectrum of its input signals.

Figure 4:
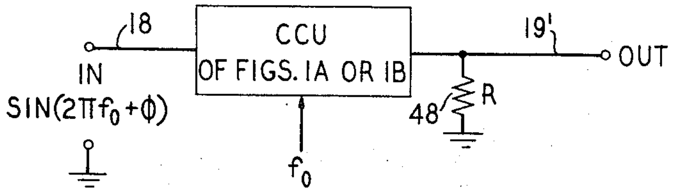
FIG. 4 is a simplified diagram of an application of the two-terminal device of the invention for facilitating a description of the characteristics of the device.

FIG. 4 depicts a commutating capacitor unit connected in series in a signal path to be operated as a band rejection filter. The unit is driven at a commutating sequence recurrence rate $f_0$. That rate corresponds to the input signal fundamental frequency since the input is a sine wave which is represented by the expression sin $(2\pi f_0+\Phi)$. Thus, $\Phi$ is the phase displacement between the input signal wave and the recurrence of the sequence of the commutation drive. A resistor 48 having a resistance R ohms is connected across the output of the circuit of FIG. 4 to represent schematically the source impedance of the circuit as seen looking back into the output of the circuit from the right-hand side of the drawing.

Figure 5:
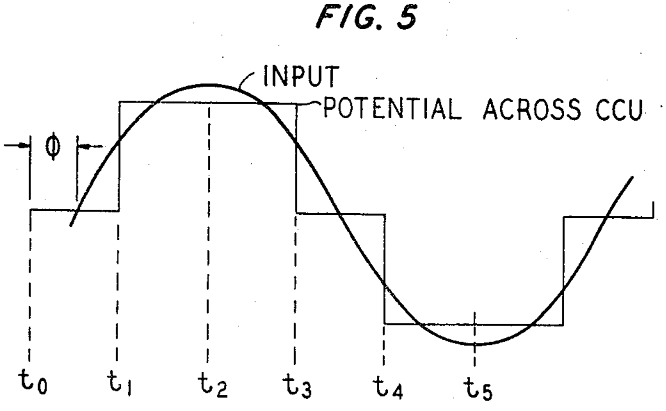
FIG. 5 contains a pair of voltage wave diagrams for illustrating the operation of the invention.

In FIG. 5, there are shown the input sine wave for the circuit of FIG. 4 and the resulting stepwise voltage function which appears across the commutating capacitor unit between the input connection 18 and the output connection 19'. The phase displacement $\Phi$ causes two of the commutation switching transitions to occur at the 90° and 270° points (times $t2$ and $t5$) of the input sine wave. Consequently, the step voltage function across the commutating capacitor unit is symmetrically arranged with respect to the lobes of the sine wave.

In FIG. 5, the stepwise voltage waveform includes a different step for each commutation switching position in the CCU. The amplitude of each step corresponds to the average input sine wave signal voltage between the input connection 18 and output connection 19' over the time interval of the step. Thus, even though only three capacitors are included in the CCU, six discrete voltage steps are included in the stepwise waveform across the CCU. That latter waveform as shown in FIG. 5 is the theoretically perfect waveform that would result from ideal operation. Certain spurious effects appear across the CCU and across the source impedance 48 at the output terminals of the circuit in FIG. 4 as will be subsequently outlined. However, in the overall concept, the response of the commutating capacitor unit is similar to that of the parallel connected LC circuit of FIG. 1C. The principal signal appearing across the commutating capacitor unit is of the same frequency as the input signal wave. Energy of that same frequency is, therefore, severely attenuated in the output of the circuit of FIG. 4. Insofar as transients are concerned, the CCU can be shown to have a first order time constant as does a parallel LC circuit.

It is also useful to discuss here the impulse response of a CCU of the type herein disclosed. If the input to the circuit of FIG. 4 is a single signal spike, instead of the illustrated sine wave input, the waveform across the CCU is still a stepwise voltage function of the general configuration illustrated in FIG. 5 but of smaller amplitude. This arises from the fact that a plurality of the interconnected capacitors are connected between CCU input and output connections at each step of the commutation sequence.

Certain spurious responses appear in the circuit of FIG. 4 with a sine wave input, and some of those responses are not usually found in connection with a conventional parallel LC circuit such as shown in FIG. 1C. A certain amount of fundamental frequency energy leaks through the CCU of FIG. 4 to the output circuit thereof as noise, and certain harmonics generated in the circuit also appear at that output. In addition, harmonic effects appear across the CCU; and, if there is harmonic energy in the input signal wave, certain effects of that energy are also produced in the circuit of FIG. 4. Likewise, spurious noise effects can result from inequalities among the capacitances of the capacitors utilized in the commutating capacitor circuit, and from a lack of exact frequency correspondence between the fundamental frequencies of the input wave to the circuit of FIG. 4 and the rotation frequency of commutation of the capacitors in the commutating capacitor unit.

Considering first the noise effects in the output of the circuit of FIG. 4, assume that the input signal is free of all harmonics of the fundamental frequency $f_0$ and that such frequency is also exactly the frequency of commutation for the commutating capacitor unit. The amplitude of the fundamental component of the stepwise voltage approximation across the CCU is smaller than the input sine wave amplitude by a factor $(3/\pi)^2$. Consequently, the noise appearing across resistor 48 is $(1 - (3/\pi)^2) = 0.088$ of the input sine wave voltage amplitude. Thus the depth of the notch in the band rejection filter response of the circuit of FIG. 4 is approximately 21 dB down as compared to the frequencies outside the notch. In addition, however, there is output noise power at certain harmonic frequencies. If the total power, i.e., the mean square of the voltage, of the input waveform is one-half then the power of the stepwise approximation is $\frac{1}{2} * (3/\pi)^2$; and the noise-to-signal power is $(1 - (3/\pi)^2) = -10.5$ dB. This calculation includes the 21 dB of noise at the fundamental, and when that is subtracted out the ratio of the noise power at the harmonics to the signal power becomes $-10.95$ dB. The mentioned harmonic noise power lies in the fifth, seventh, eleventh, etc. harmonics, i.e., at odd harmonics other than those which are multiples of three. It is apparent then that the even harmonics and the odd harmonics which are multiples of three simply do not appear in the output of the circuit of FIG. 4.

It was mentioned that the amplitude of the stepwise voltage approximation across the CCU is somewhat less than the amplitude of the input fundamental frequency wave. In like manner, odd harmonics, except those which are multiples of three, appear across the CCU with amplitudes which are further reduced from the fundamental amplitude by the factor 1/N where N is equal to the harmonic number.

If the input signal wave to the circuit of FIG. 4 includes harmonics of the fundamental, the amplitude of the stepwise voltage approximation across the CCU depends upon the harmonic input in a similar 1/N fashion. For instance, a unit amplitude input signal at the fifth harmonic produces a signal with 1/5 amplitude at the fundamental, 1/25 amplitude at the fifth harmonic, 1/35 amplitude at the seventh harmonic, etc. In each of these cases, of course, the amplitude is also reduced by the factor $(3/\pi)^2$ as previously discussed for the case of a pure fundamental frequency input.

Should the input signal frequency not correspond exactly to the commutation frequency $f_0$, i.e., an input frequency of $f_0+\epsilon$. The noise spectrum across the CCU and across output resistor 48 includes frequencies $f_0+\epsilon$, $5f_0-\epsilon$, $7f_0+\epsilon$, $11f_0-\epsilon$, etc. In addition any input frequency which is a member of the foregoing set produces the complete range of noise frequencies. Noise effects of this type will generally be virtually negligible since in most applications the fundamental input frequency will be used to synchronize the commutating frequency of the CCU.

Another possible noise factor in the operation of a commutating capacitor unit arises from lack of exact equality among the capacitors 10, 11, and 12 in the unit. However, in this area the noise effect is a vectorial sum of the capacitance discrepancies rather than being a direct sum thereof. It has been found that the resultant noise lies principally at the third harmonic, and its magnitude is inversely proportional to the maximum capacitance variation with the result that a difference of approximately 10 percent in capacitance values produces a noise effect which is about one-thirtieth of the fundamental signal amplitude.

Figure 6A:
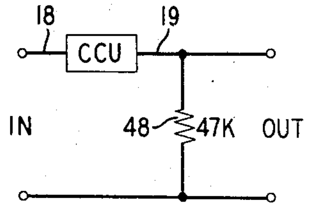
FIGS. 6A and 6B illustrate the utilization of the invention as a band rejection filter.
Figure 6B:
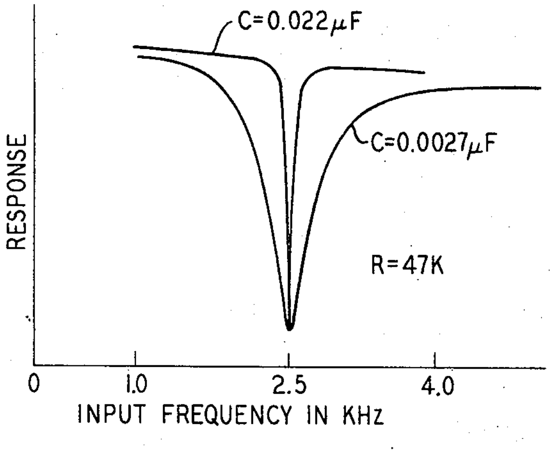

FIGS. 6A and 6B depict the application of a commutating capacitor unit as a band rejection filter, i.e., much the same application previously illustrated in connection with FIG. 4. The diagram of FIG. 6B illustrates the response of the circuit of FIG. 6A as determined across the source resistor 48. When the resistor has a value of 47,000 ohms, the illustrated responses were obtained with an essentially pure input sine wave signal which was swept between 1 and 4 kilohertz. A 15 kilohertz signal was provided by the clock 43 in FIG. 3. In one of the two cases illustrated in FIG. 6B, i.e., that in which the capacitors in the CCU were all of substantially the same capacitance, namely, 0.0027 microfarads, the response contained a much broader flare than for the case in which the capacitors all had the larger capacitance value of 0.022 microfarads.

Figure 7A:
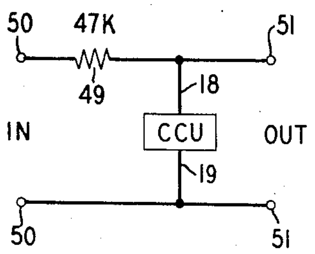
FIGS. 7A, 7B, and 7C illustrate the utilization of the invention as a bandpass filter.
Figure 7B:
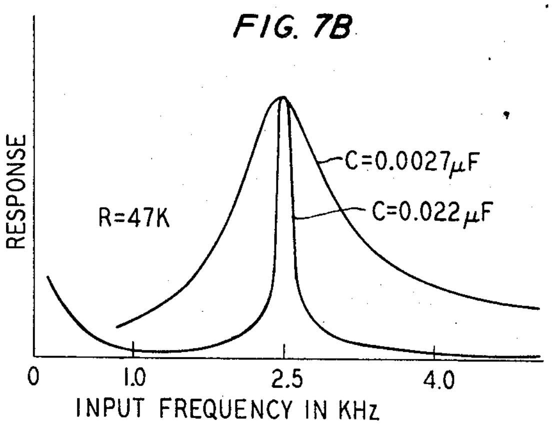

FIGS. 7A and 7B relate to an application of a CCU as a bandpass filter. In this case the CCU is connected across the signal transmission path output. An input resistor 49, also illustratively of 47,000 ohms, is connected in series in that path between input terminals 50 and output terminals 51 of the path. Here again the response for the case utilizing the smaller capacitance value in the CCU has the broader skirts. In FIG. 7B, a rise in the response is indicated below 1 kilohertz in the experimental illustrative data, but that rise was subsequently determined to be due to a malfunction in the measuring apparatus and not due to the functioning of the CCU per se.

Figure 7C:
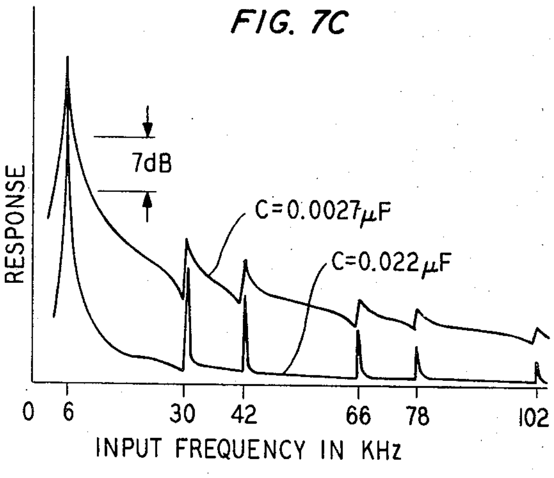

FIG. 7C illustrates the response of a circuit of the type shown in FIG. 7A over a much broader spectrum and utilizing input and commutating frequencies $f_0$ of 6 kilohertz. A scale division of 7 dB on the vertical scale is indicated in FIG. 7C to give an idea of the effectiveness of the circuit. It will be observed in FIG. 7C that the previously mentioned harmonic responses appear at the odd harmonics except those which are multiples of three. All of these harmonic responses are well attenuated, but the relative attenuation is particularly noticeable for the CCU utilizing the larger capacitance value. Similarly, the noise appearing between harmonic responses in the output as a result of the various effects hereinbefore discussed is down to a much greater extent for the case in which the CCU employed the larger capacitance value.

It should be here observed with respect to FIGS. 6A and 7A, that they represent only illustrative applications. For example, connection of a CCU can replace a parallel L-C circuit in high-pass and low-pass filters utilizing such circuits.

Figure 8:
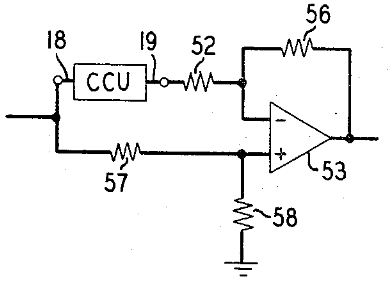
FIG. 8 is a schematic diagram of a modification of the circuit of FIG. 6A.

FIG. 8 is a schematic diagram of a modified form of the circuit in FIG. 6A. Here, however, a resistor 52 is connected in series between the commutating capacitor unit output connection 19 and an inverting input connection of an operational amplifier 53. A resistor 56 is coupled between the same input and the output of the amplifier. A feed-forward resistor 57 is connected between the input connection 18 and the true input of amplifier 53, and the latter input is connected to ground by a resistor 58. Resistors 57 and 58 have their resistances proportioned so that the signal they apply to amplifier 53 is attenuated to approximately the same extent as signals applied to the amplifier by way of the CCU at the frequency $f_0$. This results in a reduction in the net noise at the frequency $f_0$ at the amplifier input and, therefore, increases the depth of the notch without appreciably reducing the response at other frequencies. The relationship among resistances for resistors of FIG. 8 can be expressed as $R_{58}/R_{59} = R_{56}/R_{52}\ (1-(3/\pi)^2)$, where the ratio $R_{56}/R_{52}$ affects gain through the circuit of FIG. 8 at frequencies other than $f_0$.

Although the present invention has been described in connection with particular applications and embodiments thereof, it is to be understood that additional applications, embodiments, and modifications thereof which will be obvious to those skilled in the art are included within the spirit and scope of the invention.

What is claimed is:

1. In combination, a plurality of capacitors interconnected with one another in a circuit having a predetermined number, greater than two, of terminals, an input connection and an output connection, and means for coupling the terminals of different paired combinations of said terminals to said input and output connections, respectively, in a predetermined recurring sequence of time intervals, each of said combinations including in series therebetween at least two of said capacitors.

2. The combination in accordance with claim 1 in which said plurality of capacitors includes three capacitors connected in a delta circuit having three terminals, one at each apex of the delta circuit.

3. The combination in accordance with claim 1 in which said plurality of capacitors includes three capacitors connected in a delta circuit having three terminals, one at the tip of each branch of the wye remote from the central junction thereof.

4. The combination in accordance with claim 1 in which three of said capacitors are provided, and said coupling means comprises means for recurrently connecting said input connection to each of said terminals in a predetermined terminal sequence, means for recurrently connecting said output connection to each of said terminals in said terminal sequence, and means for operating said recurrent connecting means simultaneously but in different phases of said terminal sequence.

5. The combination in accordance with claim 1 in which said coupling means comprises a first plurality of switches, each connected between a different one of said terminals and said input connection, a second plurality of switches, each connected between a different one of said terminals and said output connection, and means for selectively energizing a different pair of said switches in each of said time intervals, each pair of said switches including a different combination of a switch from said first plurality of switches and a switch from said second plurality of switches.

6. The combination in accordance with claim 5 in which said selective energizing means comprises a shift register of R−1 stages where R is the number of said switches, means for applying shift pulses to said shift register at a rate $Rf_o$ where $f_o$ is a frequency of peak attenuation between said input and output connections, means for coupling to an input of a first stage in the operating sequence of stages of said register a signal of a first binary state in response to occurrence of a second binary signal state in outputs of any of R-3 central stages of said register, means for coupling outputs of said first stage and of alternate subsequent stages of said register to activate said second plurality of switches, and means for coupling outputs of said signal coupling means and of remaining stages of said register to activate said first plurality of switches.

7. The combination in accordance with claim 1 in which said coupling means comprises means for adjusting the duration of said sequence of time intervals.

8. The combination in accordance with claim 1 in which said output connection comprises resistance means connected to said coupling means, and means for deriving across said resistance means an output signal having high attenuation at the recurrence frequency of said sequence of time intervals.

9. The combination in accordance with claim 1 in which said input connection comprises resistance means connected to said coupling means, and means are provided for deriving across said input and output connections a signal from said resistance means and evidencing minimum attenuation response at the recurrence frequency of said sequence of time intervals.

10. A commutating capacitor impedance device comprising three capacitors, an input connection and an output connection, means for connecting said capacitors to each other and to a like number of terminals, and means for coupling the interconnected capacitors, by way of different pairs of said terminals in different recurrent sequential combinations, between said input and output connections.

11. An impedance device in accordance with claim 10 further comprising means for combining signals and having first and second input circuits characterized in that a common input signal applied to each input circuit produces opposite signal effects in an output circuit of said combining means, means for coupling said output connection to said first input circuit, and means for coupling said input connection to said second input circuit, the last-mentioned coupling means causing for all signals approximately the same attenuation as occurs between said input and output connections at an input signal frequency equal to the recurrence rate of said sequence.

* * * * *